UNITED STATES PATENT OFFICE.

ERNEST VOLLER, OF JERSEY CITY, AND MAXIMILIAN F. THALBERG, OF HOBOKEN, NEW JERSEY.

COMPOSITION OF MATTER.

No. 846,265.   Specification of Letters Patent.   Patented March 5, 1907.

Application filed January 7, 1907. Serial No. 351,184.

*To all whom it may concern:*

Be it known that we, ERNEST VOLLER, a resident of Jersey City, in the county of Hudson, State of New Jersey, and MAXIMILIAN FREDERICK THALBERG, a resident of Hoboken, in the county of Hudson, State of New Jersey, both citizens of the United States, have invented a new and useful Composition of Matter, to be used for lining for walls or ceilings of rooms, railroad-vehicles, and the like and for various other purposes for which a waterproof material is desired, of which the following is a specification.

Our composition consists in the following ingredients combined in the proportions stated—namely, bluestone, (copper sulfate,) one bushel; plaster-of-paris, (hydrated calcium sulfate,) one bushel; eggs, (shells ground,) fifty; water, ten gallons; coloring-matter.

In preparing our improved composition of matter we boil the bluestone in water until it is completely dissolved. To this is then added the plaster-of-paris and then the eggs, the shells of the eggs having been previously separated and very finely ground. The mixture is thoroughly mixed and agitated and the boiling continued until sufficient water has been evaporated to leave the mass in a semiplastic condition. The mixture is then poured out into pans to cool and harden and when partially cooled is preferably rolled into thin sheets by passing the same between rollers of any suitable character. The product as thus formed comprises thin sheets of material which are thoroughly waterproof and fireproof and which are slightly flexible and resilient. The sheets may be readily cut or punched to fit them for the purpose for which they are to be used and may, if desired, be embossed with any suitable design while being rolled.

The composition is adapted for any purpose for which a hard waterproof and fireproof material is desired; but it is particularly adaptable for use as a lining for ceilings, walls, and the like.

While the material is being formed any suitable coloring-matter may be introduced to produce the color or tint desired for the resulting product. This coloring-matter may be an anilin dye, as the quantity of such dye would be so small in comparison with the main body as not to interfere in any way with the properties of the material save its color.

Having thus described our invention, we claim as new and desire to secure by Letters Patent—

1. The herein-described composition of matter, consisting of water, copper sulfate, plaster-of-paris, and eggs, substantially as described.

2. The herein-described composition of matter, consisting of water, copper sulfate, plaster-of-paris, eggs, and a coloring-matter.

3. The herein-described composition of matter, formed of water, ten gallons, copper sulfate, one bushel, plaster-of-paris, one bushel, and fifty eggs, including the ground shells.

In testimony whereof we have signed our names to this specification in the presence of two subscribing witnesses.

ERNEST VOLLER.
MAXIMILIAN F. THALBERG.

Witnesses:
JOHN N. JURGENSEN,
CLAIR W. FAIRBANK.